United States Patent [19]

Sebor

[11] Patent Number: 5,445,396
[45] Date of Patent: Aug. 29, 1995

[54] NESTABLE DOLLY CONSTRUCTION

[75] Inventor: Pavel Sebor, Transvall, South Africa

[73] Assignee: Gale Group, Inc., Apopka, Fla.

[21] Appl. No.: 104,220

[22] Filed: Aug. 9, 1993

[51] Int. Cl.$^6$ ............................................. B62B 3/16
[52] U.S. Cl. ........................ 280/33.998; 280/79.11; 47/66; 108/53.3; D34/23
[58] Field of Search ............... 280/33.998, 79.11, 79.4, 280/87.01, 87.021; 47/86, 87, 66; 108/53.5, 55.5, 25, 91; 211/194; 248/129; D34/23

[56] References Cited

U.S. PATENT DOCUMENTS

| D. 302,944 | 8/1989 | Mount | D34/23 X |
|---|---|---|---|
| 2,707,351 | 5/1955 | Walker | 47/39 M |
| 2,711,906 | 6/1955 | Rideout et al. | 280/33.998 X |
| 4,060,252 | 11/1977 | Mowery | 280/79.11 |
| 4,838,176 | 6/1989 | Bowser, Sr. et al. | 108/53.3 |

FOREIGN PATENT DOCUMENTS

| 2406753 | 9/1974 | Germany | 280/33.998 |
|---|---|---|---|
| 3266770 | 11/1991 | Japan | 280/33.998 |

Primary Examiner—Brian L. Johnson
Attorney, Agent, or Firm—Allen, Dyer, Doppelt, Franjola & Milbrath

[57] ABSTRACT

A construction for nestable dollies particularly suited for plant containers includes a platform having opposing first and second surfaces and plural wheel assemblies rotatably affixed to the second surface. The platform has plural wheel wells spaced across the first surface and dimensioned for receiving a wheel of another, nested dolly.

16 Claims, 3 Drawing Sheets

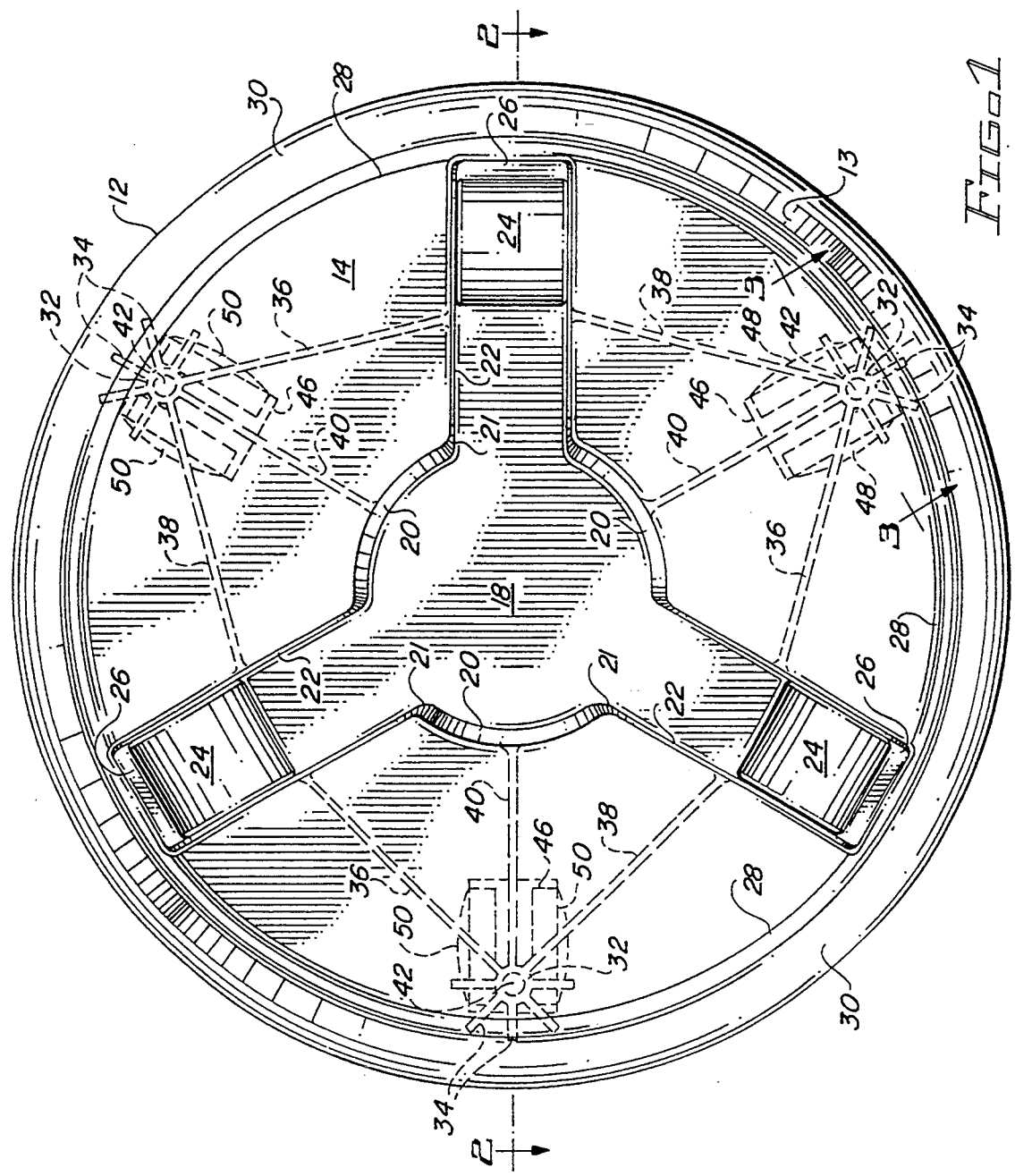

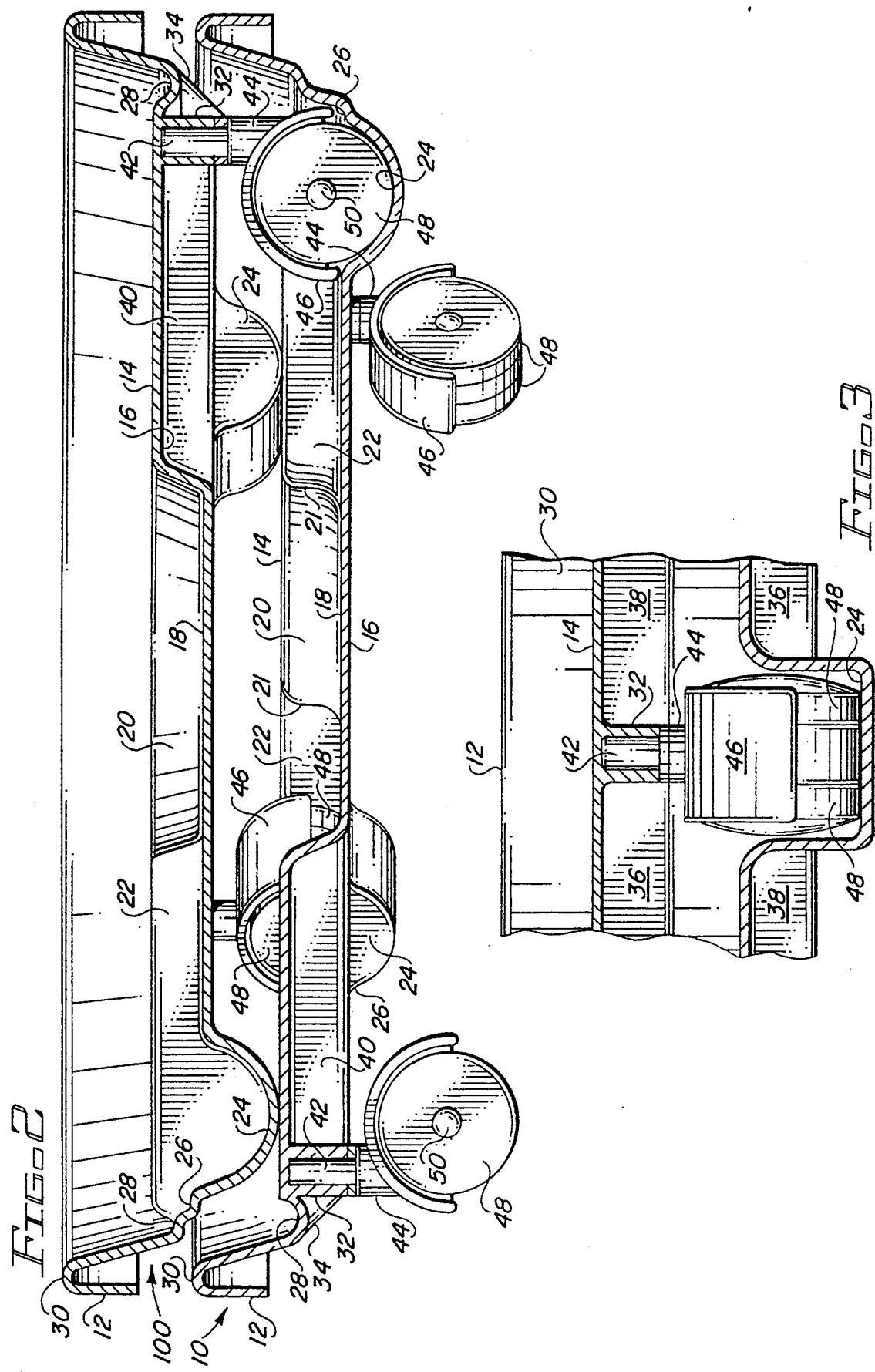

NESTABLE DOLLY CONSTRUCTION

BACKGROUND OF THE INVENTION

The present invention is directed to a dolly useful in supporting plant containers and similar structures, and is specifically directed to a construction of a dolly which is nestable with a plurality of other dollies of similar construction.

The term "dolly" among other things, is defined as a platform on rollers, wheels or casters for moving heavy objects.

There have been a variety of dolly constructions suggested in the prior art. Examples of such arrangements are disclosed in the following U.S. Pat. Nos. 3,346,271 to Parsons; 3,523,694 to Oliver; 5,085,448 to Shubin; 1,912,847 to Klepel; 2,610,750 to Hulbert; 2,711,906 to Rideout et al; 2,766,993 to Reichelt; 2,827,302 to Skyrud; 2,862,720 to Stone et al.; and 4,032,165 to Russell.

SUMMARY OF INVENTION

The present invention is directed to a dolly construction which permits the support of heavy objects upon an upper surface of the dolly, and also is nestable with other dollies of like construction, in order to permit the dollies to be stacked in a manner upon a retailer's shelf so that the dollies do not roll about until removed from the stack. To this end, there is provided a nestable dolly comprising a platform having opposing first and second surfaces, plural wheel assemblies rotatably affixed to the second surface of the platform and spaced from the other wheel assemblies so as to permit the platform to receive an article on the first surface and to be rolled about, and with the platform having plural wheel wells spaced across the first surface and dimensioned for receiving a wheel of another, nested dolly.

In accordance with the preferred construction, the wheel wells are spaced between adjacent wheel assemblies and extend from the first surface and beyond the plane of the second surface, so as to support the upper, nested dolly across the first surface in a spaced manner, with the wheels of the upper dolly resting in the wheel wells of the lower dolly.

The wheel assemblies may comprise conventional caster or roller constructions, and are removably affixed to the second surface of the platform by wheel retainers extending generally laterally from the second surface. The easy removability of the wheel assemblies permits a bottom most dolly to serve as a non-movable support for a stack of nested dollies on a retailer's shelf; alternatively, the stack of nested dollies may be simply inverted, so that the first surface of the lowermost dolly is adjacent the retailer's shelf.

In order to add structural integrity to the dolly, plural support ribs extend from each wheel retainer to the adjacent wheel wells and to a central indentation extending from the first surface and downwardly through the platform.

The platform is provided with a flange about the periphery of the first surface, such that the central indentation, the wheel wells and the flange serve as a reservoir for excess water, when the dolly is used as a support for a plant, so that such excess water may be retained in the event that the plant is inadvertently over-watered.

THE DRAWING

FIG. 1 is a top plan view of a nestable dolly in accordance with the present invention.

FIG. 2 is a cross sectional side view of two nestable dollies like that shown in FIG. 1, and in which the lowermost dolly is a cross section of FIG. 1 taken along the lines 2—2.

FIG. 3 is a partial cross section of a broken away portion illustrating two nestable dollies in accordance with the present invention, and in which the uppermost dolly corresponds to a cross section of FIG. 1 taken along the lines 3—3.

DETAILED DESCRIPTION

Figure 4:
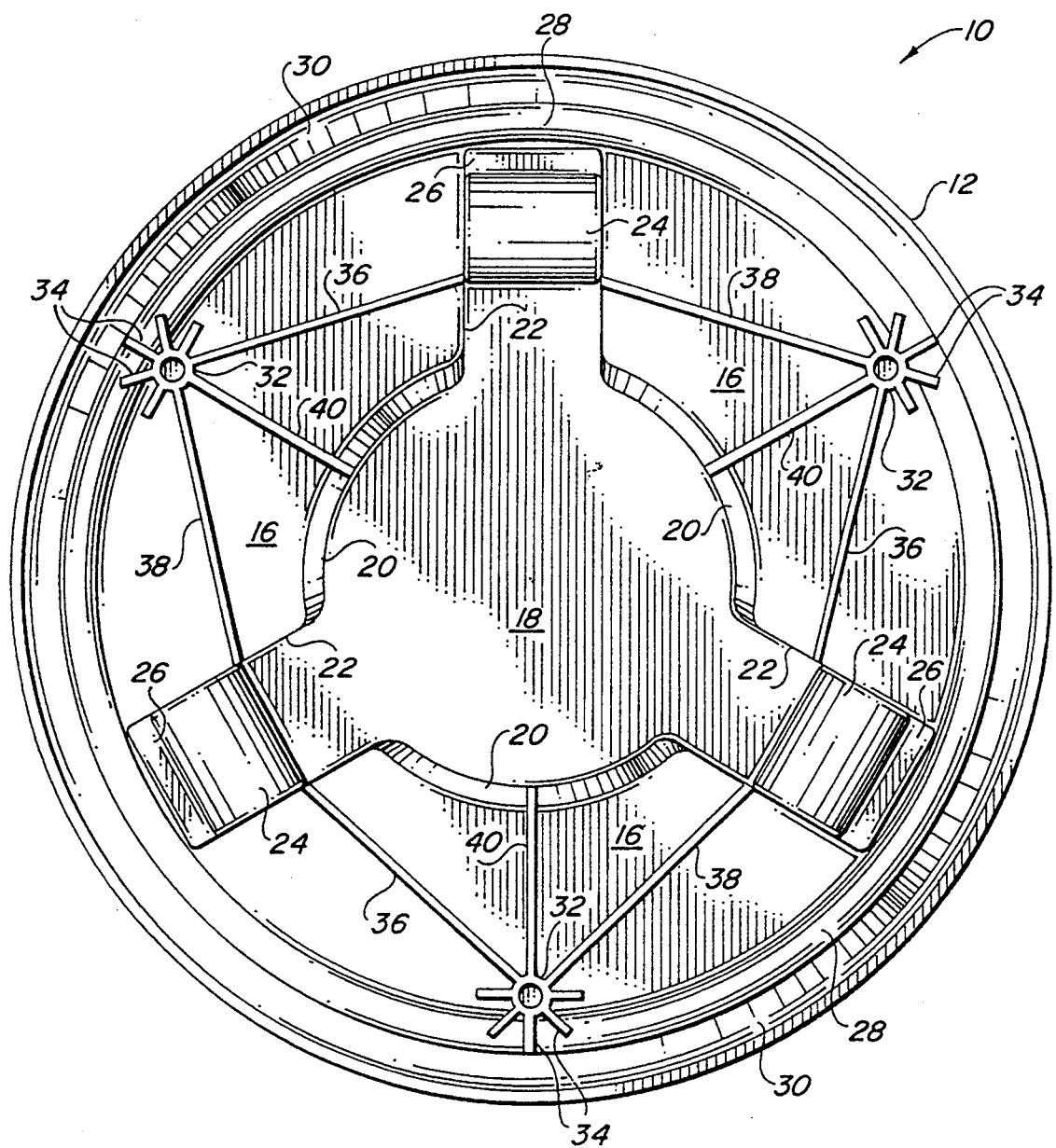
FIG. 4 is a plan view of the bottom of the nestable dolly shown in FIG. 1, with the wheel assemblies removed.

A preferred embodiment of the construction for nestable dollies in accordance with the present invention will now be described with reference to FIGS. 1-4.

Each nestable dolly in the drawing is generally referred to by the reference numeral 10, and comprises a platform 12 having an upper surface 14 and a lower surface 16. The upper surface 16 includes a central indentation 18 defined by a generally circular wall 20 interrupted by openings 21 along that wall. Each opening 21 communicates with lateral walls 22 which extend radially outwardly and communicate with wheel wells 24. Each wheel well is dimensioned to receive a corresponding wheel assembly of a nesting dolly 10, as is described in greater detail below with specific reference to FIG. 2. The specific embodiment of the dolly construction 10 shown in the drawing employs three radial wheel wells 24; however, it will be appreciated that a greater number of wheel wells may be employed, if required.

Each wheel well 24 includes an outward supporting lip 26 which is dimensioned to engage a wheel cover 46, where the wheel assembly is of the type employing a caster or roller arrangement incorporating that type of cover. The platform 12 further includes a peripheral indentation 28 and an upwardly extending flange 30 which serve as a water retainer when the dolly 10 is used as a support for a plant container, and also add structural support.

Now noting FIGS. 2, 3 and 4, there is provided plural wheel assembly retainers 32 extending from the bottom surface 16 of the platform 12. Each retainer 32 further includes supporting struts 34, 36, 38 and 40. As is shown, the struts 36 and 38 extend from the corresponding wheel retainer 32 to the adjacent radial wall 22, and strut 40 extends radially inwardly to the central wall 20. This particular strut arrangement adds significant strength to the overall construction of the dolly be. It will be appreciated by those skilled in the art that the entire platform 12, including the central indentation 18, the central wall 20, the radial walls 22, the wheel wells 24, the supporting lip 26, the indentation 28 the flange 30, the retainers 32 and supporting struts 34, 36, 38 and 40 may all be formed as a unitary molded plastic member.

As is illustrated in FIGS. 2 and 3, the wheel assemblies comprise a support rod 42 joined to a molded fixture 44 with a molded plastic cover 46 with the fixture. The wheels comprise a pair of wheel portions 48 attached together by an axle 50. The support rod 42 is dimensioned to be removably affixed in one of the retainers 32, and with the dimensions of the cover 46 and the wheel portions 48 being such as to fit within one of the wheel wells 24. As is understood by reference to FIGS. 1 and 4, the wheel wells are radially positioned between adjacent, so that the wheels of a second dolly will nest within the wheel wells of a first dolly, and the wheels of a third dolly will rest within the wheel wells of the second dolly, and so on. In that arrangement, two or three dozen dollies be may be nested together in a compact manner upon a retailer's shelf. If it is desired that the stack of nested dollies 10 not roll about the retailer's shelf, this can be achieved by simply removing the wheel assemblies of the lowermost dolly 10; alternatively, the entire stack of dollies may simply be inverted so that the upper wheel assemblies of the uppermost dollies are exposed.

The particular manner in which a pair of dollies nest together is illustrated in the cross section of FIG. 2. As noted above, the lowermost dolly 10 represents a cross section of the dolly 10 shown in FIG. 1, as viewed along the lines 2—2. It will be appreciated that the uppermost dolly, referred to by the reference numeral 100, is rotated 120° with respect to the lowermost dolly 10, in order that its wheels 48 may be extended into the wheel well 24 of the lowermost dolly 10, as is illustrated on the right hand side of FIG. 2. Similarly, it will be appreciated that the other wheel wells 24 of the uppermost dolly 100 serve as spacers resting against the upper surface 14 of the lowermost dolly 10 as is shown in the left hand portion of FIG. 2. It will thus be appreciated that the particular depth of the wheel well 24 below the plane of the first surface 14 has been selected to insure a dimensional relationship whereby the uppermost dolly 100 remains generally parallel with the lowermost dolly 10 when the two are in a nested configuration.

As was also discussed above, the nestable dolly construction of the present invention has particular utility as a dolly for plant containers, such as large flower pots. In addition to providing a construction which permits the dollies to be nested together on a retailer's shelf in a compact manner, the central indentation 18, the wheel wells 24 and the peripheral indentation 28 all provide a reservoir for retaining excess water, when the supported plant container has been inadvertently overwatered. While it is of course possible to place drainage holes in the bottom of the wheel wells, this would not be desirable if the supported plant is located in the owner's home; therefore, the various indentations of the specific construction of the dolly 10 of FIGS. 1-4 provides the very important benefit of a reservoir, while avoiding unnecessary spillage of the excess water.

This concludes the description of the preferred embodiments. A reading by those skilled in the art will bring to mind various changes without departing from the spirit and scope of the invention. It is intended, however, that the invention only be limited by the following appended claims.

What is claimed is:

1. Plural nestable dollies, each dolly comprising:
   a platform having opposing first and second surfaces;
   plural wheel assemblies, each wheel assembly fitted with the second surface and spaced from the other wheel assemblies so as to permit the platform to receive an article on the first surface and to be rolled about;
   each platform having plural wheel wells spaced laterally between adjacent wheel assemblies across the first surface; and
   the wheels and wheel wells being spaced and dimensioned so that when an upper dolly and a lower dolly are nested together, the wheel wells of the upper dolly rest upon the first surface of the lower dolly and the wheels of each assembly of the upper dolly extend into, and are removably affixed within a corresponding wheel well of the lower dolly.

2. The nestable dollies recited in claim 1 wherein the wheel wells are spaced between adjacent wheel assemblies.

3. The nestable dollies recited in claim 2 wherein the wheel wells extend from the first surface and beyond the plane of the second surface.

4. The nestable dollies recited in claim 1 wherein each of the wheel wells defines an extremity lying in a common, imaginary plane which is generally parallel with the first and second surfaces.

5. The nestable dollies recited in claim 4 wherein the common imaginary plane is closer to the second surface than a distal extremity of the wheel assemblies.

6. The nestable dollies recited in claim 5 wherein the platform further comprises a peripheral flange surrounding the first surface.

7. The nestable dollies recited in claim 1 further comprising plural wheel assembly retainers extending from the second surface, each wheel assembly including a support rod extending into a corresponding one of the wheel assembly retainers.

8. The nestable dollies recited in claim 7 further comprising structural support ribs along the second surface extending from each wheel retainer to the adjacent wheel well.

9. The nestable dollies recited in claim 8 wherein the platform, the wheel wells, the wheel retainers and the support ribs comprise a unitary molded member.

10. The nestable dollies recited in claim 8 wherein the wheel wells extend radially from a central location of the first surface of the platform, the platform further comprising a central indentation in the first surface and extending beyond the plane of the second surface.

11. The nestable dollies recited in claim 10 further comprising structural support ribs extending from each wheel retainer and to the central indentation.

12. The nestable dollies recited in claim 1 wherein each dolly comprises a unitary molded member defining the platform and the wheel wells.

13. The nestable dollies recited in claim 1 wherein each of the wheel wells of each dolly defines an extremity lying in a common, imaginary plane which is generally parallel with the plane of the first and second surfaces of the corresponding dolly, so that the platforms of both dollies lie generally parallel when the wheel wells of one dolly rest upon the first surface of the other dolly.

14. The nestable dollies recited in claim 1 wherein each platform further comprises a peripheral flange surrounding the corresponding first surface.

15. The nestable dollies recited in claim 1 wherein each wheel well defines a generally semi-cylindrical indentation, and wherein each wheel assembly comprises a generally cylindrical caster dimensioned to fit within and be retained by a corresponding wheel well of the other dolly.

16. The nestable dolly recited in claim 15 wherein each cylindrical wheel assembly includes a support rod joined with the second surface of a corresponding platform.

* * * * *